(12) United States Patent
Choi et al.

(10) Patent No.: US 8,678,069 B2
(45) Date of Patent: Mar. 25, 2014

(54) PHOTOVOLTAIC BLIND WINDOW

(75) Inventors: Chul June Choi, Daejeon (KR); Dong Hun No, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 13/392,740

(22) PCT Filed: Jan. 12, 2011

(86) PCT No.: PCT/KR2011/000226
§ 371 (c)(1),
(2), (4) Date: Feb. 27, 2012

(87) PCT Pub. No.: WO2011/087281
PCT Pub. Date: Jul. 21, 2011

(65) Prior Publication Data
US 2012/0152469 A1 Jun. 21, 2012

(30) Foreign Application Priority Data
Jan. 14, 2010 (KR) .................. 10-2010-0003383

(51) Int. Cl.
*E06B 3/32* (2006.01)
*E06B 9/00* (2006.01)

(52) U.S. Cl.
USPC ........................................ 160/107; 160/127

(58) Field of Classification Search
USPC .................................. 160/107, 127
See application file for complete search history.

(56) References Cited

U.S. PATENT DOCUMENTS

| 4,137,098 | A | * | 1/1979 | Field | 136/248 |
| 5,221,363 | A | * | 6/1993 | Gillard | 136/248 |
| 7,617,857 | B2 | * | 11/2009 | Froese | 160/10 |
| 2007/0278200 | A1 | * | 12/2007 | Muromachi et al. | 219/203 |
| 2010/0243025 | A1 | * | 9/2010 | Bhatia et al. | 136/244 |
| 2011/0048656 | A1 | * | 3/2011 | Chu et al. | 160/310 |
| 2011/0126992 | A1 | * | 6/2011 | Yordanova | 160/127 |

FOREIGN PATENT DOCUMENTS

| JP | 2004-027661 A | 1/2004 |
| JP | 2007-113365 A | 5/2007 |
| JP | 2007-231613 A | 9/2007 |
| JP | 2008-007934 A | 1/2008 |
| JP | 2009-270382 A | 11/2009 |
| KR | 20-0446074 Y1 | 9/2009 |

* cited by examiner

*Primary Examiner* — Katherine Mitchell
*Assistant Examiner* — Jeremy Ramsey
(74) *Attorney, Agent, or Firm* — Nath, Goldberg & Meyer; Jerald L. Meyer; Scott C. Langford (57) ABSTRACT

The present invention relates to a building integrated photovoltaic (BIPV) system, and more specifically, to a photovoltaic blind window having a photovoltaic cell applied to an electric blind. The photovoltaic blind window of the invention comprises: a multilayered glass composed of a pair of plate glass sheets that are connected to each other with a spacer to form an inner space between the plate glass sheets; an electric blind placed in the inner space of the multilayered glass, the blind having a plurality of slats elevating or tilting by the rotation of a drive motor; a plurality of photovoltaic cells arranged on at least one side of the slat; and a storage battery for storing electricity that is generated by the photovoltaic cells.

18 Claims, 7 Drawing Sheets

PHOTOVOLTAIC BLIND WINDOW

This is a National Phase Application filed under 35 U.S.C. 371 as a national stage of PCT/KR2011/000226, filed on Jan. 12, 2011, an application claiming the benefit from Korean Application No. 10-2010-0003383 filed on Jan. 14, 2010, the entire content of each of which is hereby incorporated by reference in its entirety.

TECHNICAL FIELD

The present invention relates to a building integrated photovoltaic (BIPV) system, and more particularly to a photovoltaic blind window having photovoltaic cells applied to an electric blind.

BACKGROUND ART

Generally, buildings are provided with a BIPV system which serves as an exterior building material and a photovoltaic generator. However, conventional BIPV systems have limited applications to exterior walls and roofs of buildings.

In addition, buildings are provided with a blind for regulating the amount of indoor light and insulation glass, that is, multilayer glass, which has been increasingly used to provide insulation effects. Further, there is increasing demand for a heat generating window which includes an electric heating line to generate heat.

When installing a heat generating window or blind window requiring electric power on a building, the window is inevitably deformed to form a certain shape such as a hole for receiving electric power from the outside, and is provided with a particular device which connects an electric wire to a power source outside the window.

The present invention is directed to providing a photovoltaic blind window, which combines multilayer glass and an electric blind, may generate electric power for the electric blind and a heat generating glass, and may supply the generated electric power to an external device.

DISCLOSURE

Technical Problem

The present invention provides a photovoltaic blind window which is provided with photovoltaic cells to allow an electric blind to generate electric power and to be actuated using the generated electric power, thereby eliminating a separate wire or device for installation of the photovoltaic blind window on buildings.

The present invention also provides a photovoltaic blind window, in which a wire for connecting photovoltaic cells to each other is configured so as not to interfere with slats during tilting or elevating operation of the slats.

The present invention also provides a photovoltaic blind window which may generate and supply electric power to an external device.

Technical Solution

An aspect of the present invention provides a photovoltaic blind window including: a multilayer glass comprised of a pair of plate glass sheets joined to each other along rims thereof via spacers to form an internal space between the plate glass sheets; an electric blind received in the internal space of the multilayer glass and including a plurality of slats moved in a vertical direction or tilted by operation of a drive motor; a plurality of photovoltaic cells arranged on at least one side of each of the slats; and a storage battery storing electric power generated by the photovoltaic cells.

The storage battery may supply electric power to the drive motor, and thus the photovoltaic blind window does not receive electric power from an external power source.

The photovoltaic cells may be connected to each other in series or in parallel on a single slat. When a photovoltaic cell is connected to an adjacent photovoltaic cell in parallel on a single slate via electrodes having equal polarity, positive and negative electrodes may be positioned at opposite sides of the slat in a longitudinal direction, respectively, or the photovoltaic cell is connected to the adjacent photovoltaic cell in series on the single slat through electrodes having opposite polarities, the positive and negative electrodes may be positioned at the opposite sides of the slat in the longitudinal direction, respectively.

Further, the slats may be stacked one above another in a vertical direction and connected to each other in series or in parallel. When the slats are connected to each other in parallel, the slats may be arranged such that electrodes having equal polarity are positioned at one side of each of the slats and are connected to each other.

Further, when the slats are connected to each other in series, each of the slats may further include a dummy line separated from the photovoltaic cells and traversing the slat in the longitudinal direction such that a lowermost slat is connected to a wire via the dummy line, thereby preventing the wire from interfering with the slat upon tiling or elevating operation of the slats.

Advantageous Effects

According to exemplary embodiments, the photovoltaic blind window may generate electric power and actuate an electric blind and a heat generating window using the generated power without wire connection to an external power source, and thus does not require a separate wire or component for wire connection to the external power source, thereby enabling convenient construction and maintenance.

In addition, in the photovoltaic blind window according to the embodiments, wires connect a plurality of slats to each other only in the vertical direction and thus are prevented from interfering with the slats upon tiling or elevating operation of the slats.

Further, the photovoltaic blind window may generate and supply electric power to an external device.

BEST MODE

Embodiments of the present invention will now be described in more detail with reference to the accompanying drawings.

The above and other aspects, features, and advantages of the invention will become apparent from the detailed description of the following embodiments in conjunction with the accompanying drawings. Exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide a thorough understanding of the invention to those skilled in the art. Herein, descriptions of details apparent to those skilled in the art will be omitted for clarity. Like components will be denoted by like reference numerals throughout the specification.

In the drawings, the sizes and relative sizes of elements may be exaggerated for clarity. Further, it will be understood that when a certain element is referred to as being "present inside" or "connected to" another element, the certain element can adjoin the other element or can be separated from the other element. When the element is separated from the other element, it should be understood that an intervening element can also be present to connect the certain element to the other element even without a description thereof in the specification.

Figure 1:
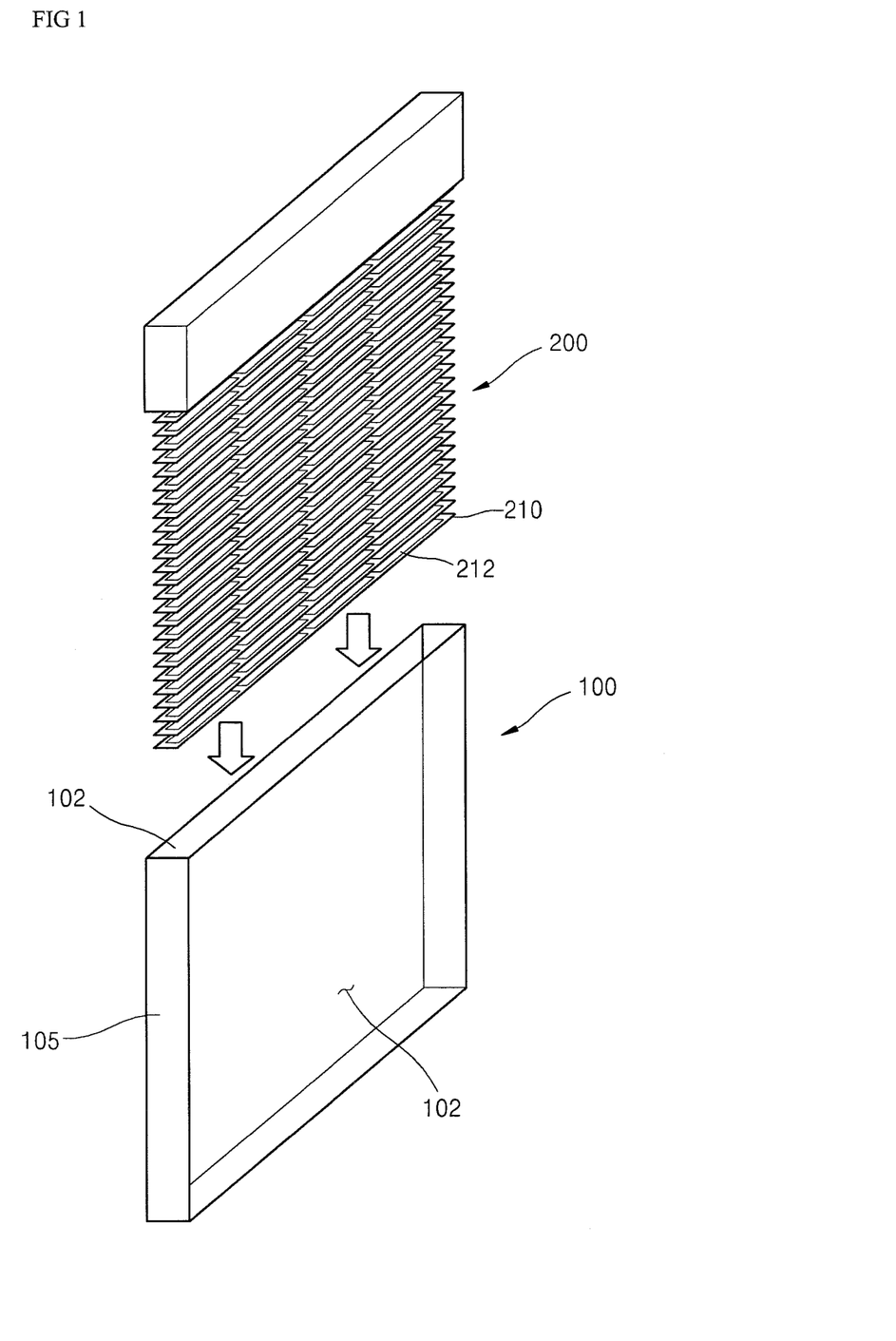
FIG. 1 is an exploded perspective view of a photovoltaic blind window according to an exemplary embodiment of the present invention.

FIG. 1 is an exploded perspective view of a photovoltaic blind window according to an exemplary embodiment of the present invention.

Referring to FIG. 1, the photovoltaic blind window according to this embodiment includes multilayer glass 100 comprised of a pair of plate glass sheets 102 joined to each other along rims thereof via spacers 105 to form an internal space between the plate glass sheets 102, and an electric blind 200 received in the internal space of the multilayer glass 100.

Examples of the plate glass sheet 102 include plate glass, reinforced glass, laminated glass, and the like. Further, a heat generating window including an electric heating line may be used as the plate glass sheet.

Three sides of the combined plate glass sheets 102 are sealed by the spacers 105, and the electric blind 200 is inserted into an open upper side of the plate glass sheets, and the open upper side of the plate glass sheets is then closed by a housing of the electric blind 200.

The electric blind 200 includes a plurality of slats 210, which is moved in a vertical direction or tilted by operation of a drive motor (not shown).

The electric blind 200 is provided therein with a storage battery (not shown), which stores electric power generated by photovoltaic cells described below, such that the stored electric power can be used for operation of the drive motor (not shown) or the heat generating window. More preferably, an external connection wire is provided to the electric blind in order to supply electric power stored in the storage battery to the outside, such that the generated power can be used for operation of external devices as well as operation of the electric blind.

Thus, the photovoltaic blind window may further include a power terminal, which is connected to the storage battery and exposed to the outside.

The electric blind 200 may be manipulated by a switch disposed at one side of the blind window or may be manipulated by a separate remote controller.

Figure 2:
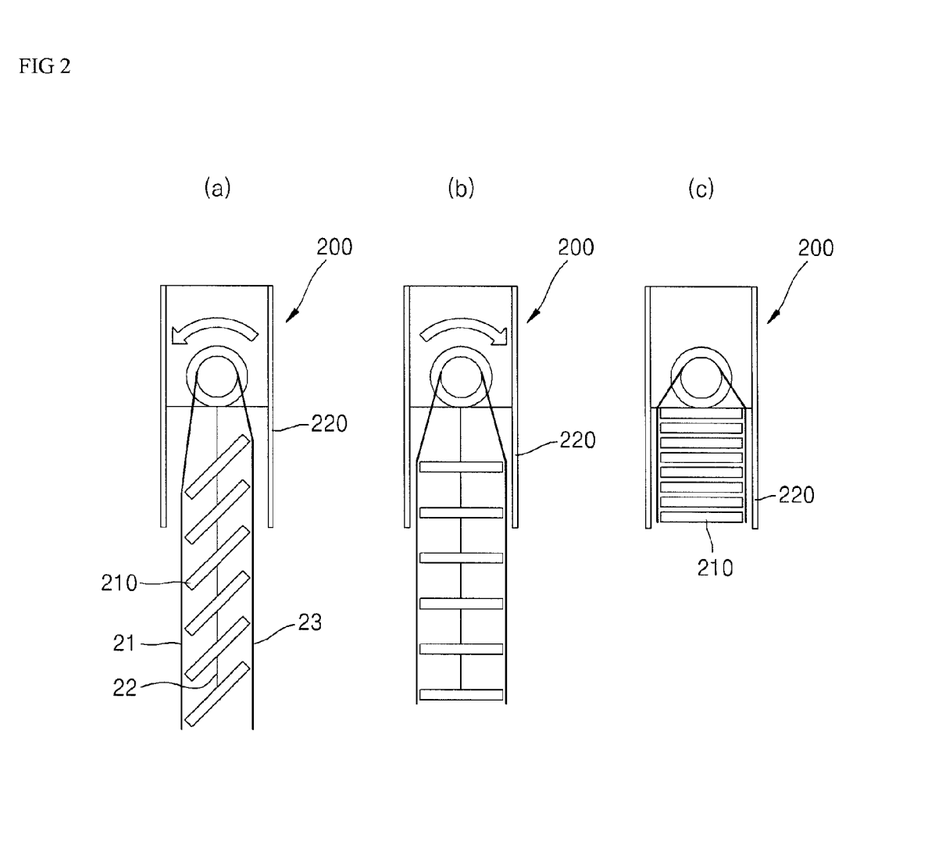
FIG. 2 is side-sectional views of an electric blind during operation.

FIG. 2 is a side-sectional view of the electric blind during operation.

The plural slats 210 are connected to one another via three connection wires 21, 22, 23. A connection wire 22 is disposed at the center of the slits 210 to regulate vertical movement of the slats 210, and two connection wires 21, 23 are disposed at the left and the right of the slits 210 to regulate the degree of inclination of the slats 210.

FIG. 2(a) shows the slats 210 tilted left downwards when the connection wire 21 at the left side of the slats 210 is lowered and the connection wire 23 at the right side of the slats 210 is raised.

Then, when the connection wire 23 at the right side of the slats 210 is lowered and the connection wire 21 at the left side of the slats 210 is raised from the state as shown in FIG. 2(a), the slits are placed as shown in FIG. 2(b). Then, when the connection wire 23 at the right side of the slats 210 is further lowered and the connection wire 21 at the left side of the slats 210 is further raised from the state as shown in FIG. 2(b), the slats 210 are tilted right downwards.

FIG. 2(c) shows the slats 210 received in a housing 220 by winding the central connection wire 22. As shown in FIG. 2(c), the housing 220 may be configured to receive all of the slats 210 such that the slats are not exposed to the outside when the slats are elevated and brought into contact with each other.

Figure 3:
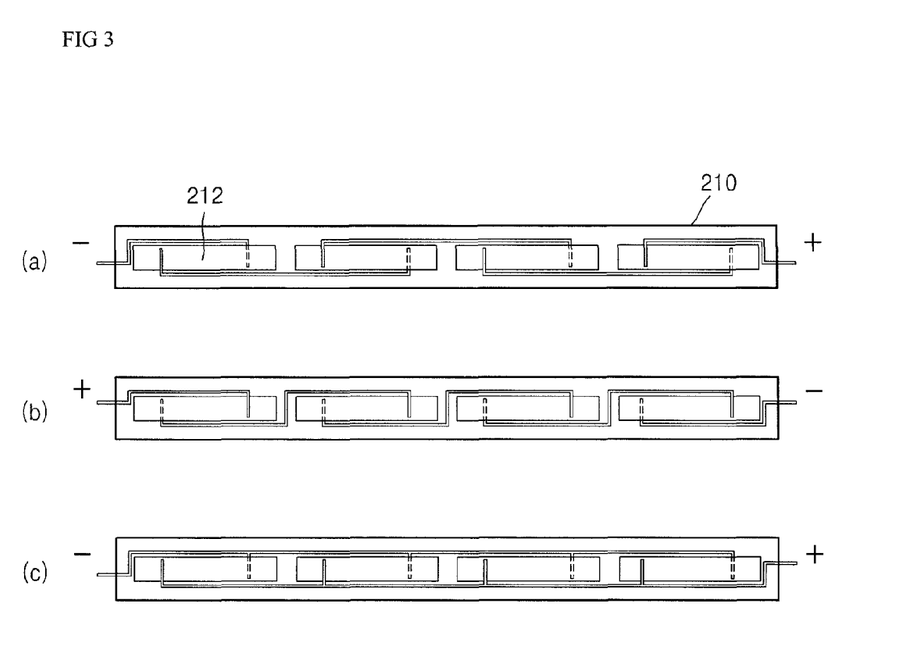
FIG. 3 is plan views explaining a method of connecting a plurality of photovoltaic cells to each other in a single slat.

FIG. 3 is plan views explaining a method of connecting a plurality of photovoltaic cells to each other in a single slat.

When a photovoltaic cell receives sunlight, a rear side of the photovoltaic cell becomes a positive (+) electrode and a front side of the photovoltaic cell becomes a negative (−) electrode.

According to the embodiment of the invention, however, since a plurality of photovoltaic cells is attached to a single slat instead of constituting the single slat only with a single photovoltaic cell, the photovoltaic cells 212 provided to the single slat 210 are connected to each other.

FIGS. 3(a) and 3(b) show the plurality of photovoltaic cells 212 connected to each other in series on a single slat, and FIG. 3(c) shows the plurality of photovoltaic cells 212 connected to each other in parallel on a single slat. These views show the front sides of the photovoltaic cells 212, in which a solid line indicates connection between a ribbon 215 and an upper surface of each photovoltaic cell 212 and a dotted line indicates connection between a ribbon 215 and the back of each photovoltaic cell 212.

The photovoltaic cells 212 are connected to each other via the ribbons 215. Herein, the ribbon 215 refers to an electric wire containing tin, silver, copper, and the like.

In FIGS. 3(a) and 3(b), the plurality of photovoltaic cells 212 is connected to each other in series on a single slat to obtain high voltage. As described above, the polarities of the photovoltaic cell are determined according to the direction of received sunlight, and series connection between the photovoltaic cells is achieved by alternately connecting a front side of a photovoltaic cell to a rear side of another photovoltaic cell adjacent thereto. In order to achieve alternate connection of the front and rear sides of adjacent photovoltaic cells to each other, a ribbon 215 is bent to connect one side of a photovoltaic cell to an opposite side of another photovoltaic cell adjacent thereto. If the bent ribbon is not used to connect the one side of the photovoltaic cell to the opposite side of the other photovoltaic cell adjacent thereto, an additional process such as a separate tabbing process is performed to form upper and lower electrodes of adjacent photovoltaic cells 212, which have different polarities, respectively, thereby lowering productivity.

When a single photovoltaic cell 212 generates a voltage of 1.2V, four photovoltaic cells 212 connected to each other in series generate a voltage of 4.8 V.

In FIG. 3(c), the photovoltaic cells 212 are connected to each other in parallel. In this case, the front sides of the photovoltaic cells 212 are connected to each other and the rear sides of the photovoltaic cells 212 are connected to each other. The photovoltaic cells 212 each generating a voltage of 1.2V and connected to each other in parallel generate a voltage of 1.2V.

FIGS. 4 to 7 are diagrams of a plurality of slats connected to each other in various ways.

Figure 4:
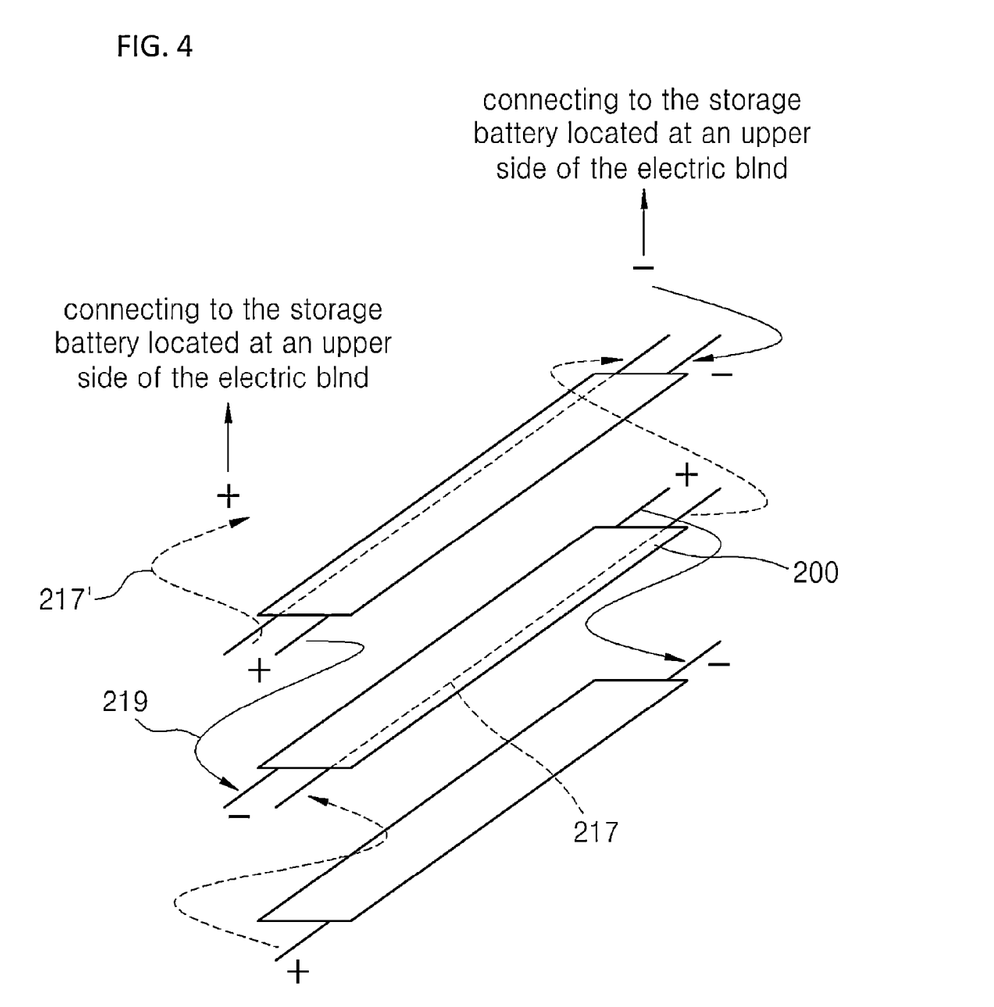
FIGS. 4 and 5 are diagrams of a plurality of slats connected to each other in series.
Figure 5:
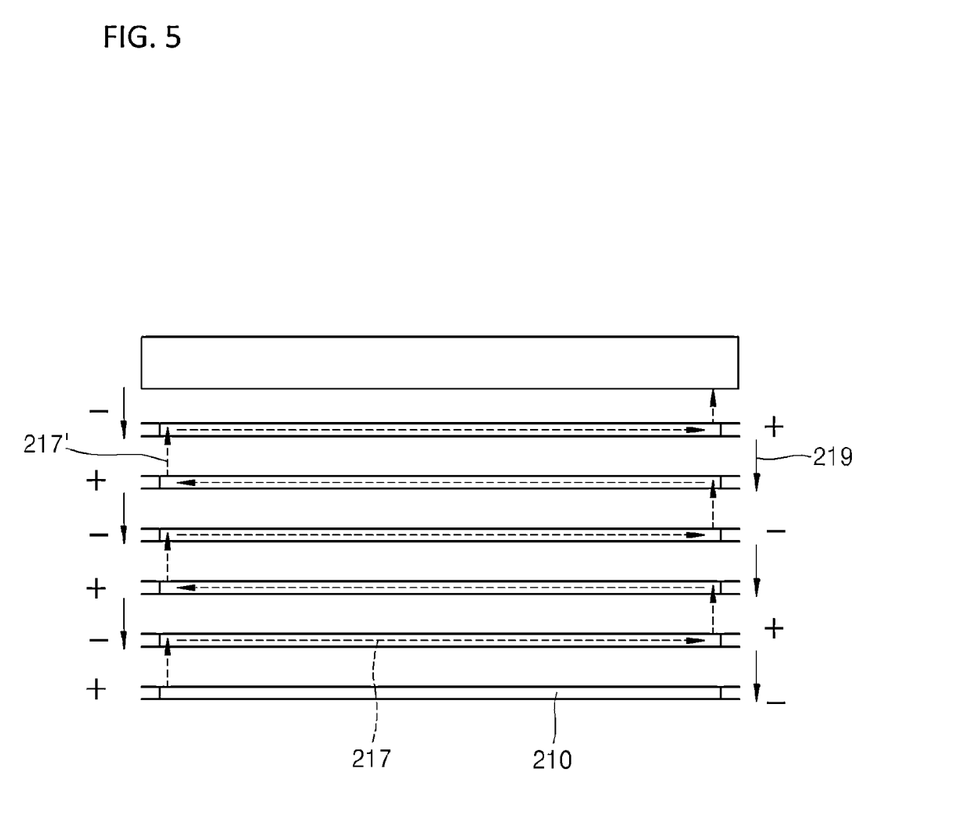

FIGS. 4 and 5 show a plurality of slats 210 stacked one above another and connected to each other in series. As shown in FIG. 3, the plurality of photovoltaic cells 212 may be connected to each other in series or in parallel on each of the stacked slats 210, which may be connected to each other in series or in parallel.

Referring to FIG. 4, when the slats 210 are connected to each other in series, each of the slats 210 is provided with a dummy line 217 which is longitudinally elongated. The dummy line 217' connects the dummy line 217 of a lowermost slat 210 to the storage battery located at an upper side of the electric blind. When serially connecting an upper slat 210 to a lower slat 210, it is important that the upper slat 210 and the lower slat 210 are connected to each other via electrodes having opposite polarities. That is, when a positive (+) electrode is positioned at a right side of the upper slat 210, a negative (−) electrode is positioned at a right side of the lower slat 210, so that electrodes having different polarities are connected to each other, by dummy lines 217', in the vertical direction.

When the positive (+) electrode of the lowermost slat 210 is connected to another slat 210 directly above the lowermost slat 210, it is necessary for the negative (−) electrode of the lowermost slat 210 to be connected to the interior of the housing. In this case, if the negative electrode of the lowermost slat 210 is directly connected to the interior of the housing, it is difficult to arrange the wires during elevation of the slats 210 and the connection wires inevitably undergo deterioration in durability due to interference upon long time use. Particularly, for a vertical type blind configured to be moved up or down, the dummy line 217', represented as dotted arrows, can sag due to its weight and interference of the connection wires with the slats can occur more frequently.

Thus, according to this embodiment, the dummy line 217' is provided to each of the slats to connect the lowermost slat to the interior of the housing via the dummy line 217 in each of the slats. Here, the dummy line 217' is not connected to the photovoltaic cells in each of the slats and serves to connect the lowermost slat to the interior of the housing.

Here, as shown in FIGS. 4 and 5, the dummy lines 217 are alternately arranged at front and rear sides of the slats in the longitudinal direction of the slats 210. With this arrangement, the dummy line 217 are moved together with the slats 210 during vertical movement of the slats 210 and thus may be connected to the lowermost slat 210, by dummy lines 217', without interference with other slats 210.

The dummy lines 217', or connection wires, between the slats 210 may be formed using a flexible printed circuit board (FPCB) or ribbon 219 which has flexibility and good durability. The connection wires between the slats 210 provide a pleasing appearance without any influence upon tilting or elevating operation of the slats 210.

Figure 6:
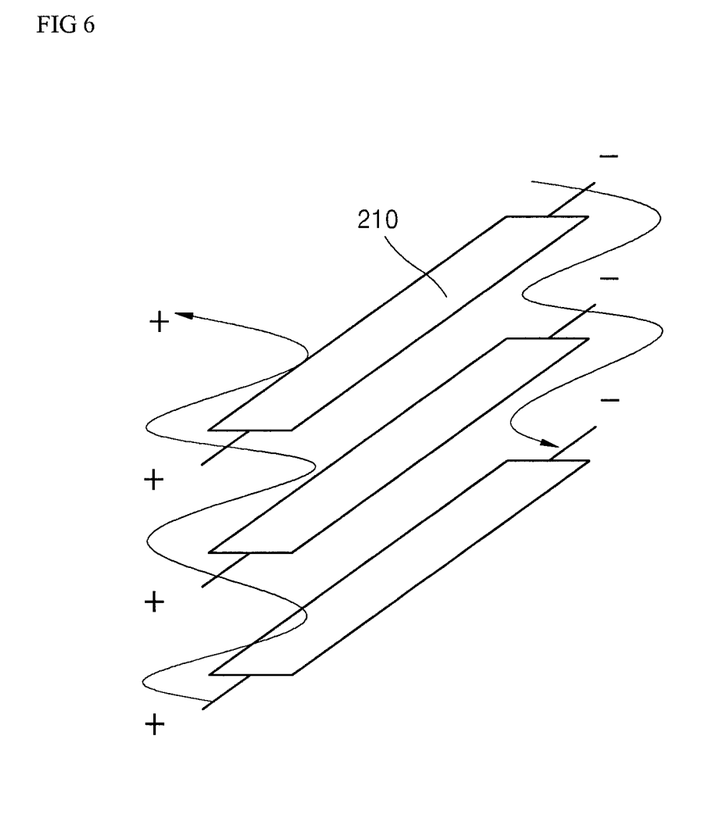
FIGS. 6 and 7 are diagrams of a plurality of slats connected to each other in parallel.
Figure 7:
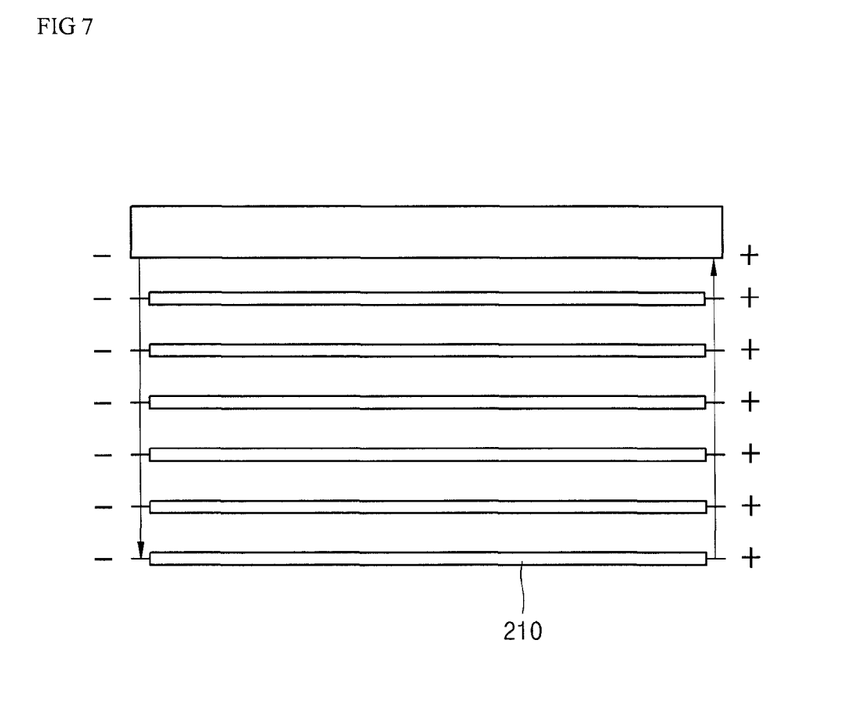

FIGS. 6 and 7 show a plurality of slats, which are stacked one above another and connected to each other in parallel.

As shown in FIG. 6, each of the slats 210 may be configured to have a positive (+) electrode and a negative (−) electrode positioned at opposite sides thereof in the longitudinal direction, such that electrodes having equal polarity are positioned at one side of all of the slats 210. In FIG. 6, the positive (+) electrodes are positioned at the left sides of the slats 210 and the negative (−) electrodes are positioned at the right sides of the slats 219.

In parallel connection, electrodes having equal polarity are connected to each other. Unlike serial connection described above, the parallel connection does not require a dummy line. In other words, only one electrode is positioned at one side of each slat and is directly connected to other electrodes positioned at other slats. Thus, as in the serial connection, a wire for connecting the electrodes to each other does not affect tilting or elevating operation of the slats 210.

As such, in the photovoltaic blind window according to the embodiments, an electric blind is received in multilayer glass and photovoltaic cells are provided to each of slats to allow only upper and lower slats to be connected to each other via a connection wire at either side of each slat, thereby providing an aesthetically arrangement of wires while preventing the wires from interfering with the slats during tilting or vertical movement of the slats.

Further, the photovoltaic blind window according to the embodiments generates electric power through the photovoltaic cells and stores the electric power in a storage battery to use the electric power for operation of the electric blind or the heat generating window, thereby eliminating requirement for a separate wire or component for connection to an external power source.

Although some embodiments have been described with reference to the accompanying drawings, it should be understood by those skilled in the art that these embodiments are given by way of illustration only, and that various modifications, variations, and alterations can be made without departing from the spirit and scope of the invention as limited by the accompanying claims and equivalents thereof.

The invention claimed is:

1. A photovoltaic blind window comprising:
a multilayer glass comprised of a pair of plate glass sheets joined to each other along rims thereof via spacers to form an internal space between the plate glass sheets;
an electric blind received in the internal space of the multilayer glass and including a plurality of slats moved in a vertical direction or tilted by operation of a drive motor;
a plurality of photovoltaic cells arranged on at least one side of each of the respective slats; and
a storage battery storing electric power generated by the photovoltaic cells,
wherein the plurality of slats are connected to each other in series, and each of the plurality of slats further include a dummy line separate from the photovoltaic cells and traversing each slat in the longitudinal direction such that one of a negative terminal and a positive terminal of a lowermost slat is connected to the other of a negative terminal and a positive terminal of an uppermost slat through the dummy lines of intermediate slats, whereby an electrical circuit is completed.

2. The photovoltaic blind window of claim 1, wherein the storage battery supplies electric power to the drive motor.

3. The photovoltaic blind window of claim 1, further comprising:
a power terminal connected to the storage battery and exposed to an outside of the window.

4. The photovoltaic blind window of claim 2, wherein the photovoltaic cells are connected to each other in series or in parallel on a single slat.

5. The photovoltaic blind window of claim 4, wherein each of the photovoltaic cells is connected to an adjacent photovoltaic cell in parallel via electrodes having equal polarity on a single slat such that positive and negative electrodes are positioned at opposite sides of the slat in a longitudinal direction.

6. The photovoltaic blind window of claim 4, wherein each of the photovoltaic cells is connected to an adjacent photovoltaic cell in series via electrodes having opposite polarities on a single slat such that positive and negative electrodes are positioned at opposite sides of the slat in a longitudinal direction.

7. The photovoltaic blind window of claim 6, wherein each of the photovoltaic cells is connected to an adjacent photovoltaic cell via a ribbon alternately connecting front and rear sides of the photovoltaic cells adjacent each other such that the adjacent photovoltaic cells are connected to each other in series.

8. The photovoltaic blind window of claim 5, wherein the slats are stacked one above another in a vertical direction and are connected to each other in series or in parallel.

9. The photovoltaic blind window of claim 6, wherein the slats are stacked one above another in a vertical direction and are connected to each other in series or in parallel.

10. The photovoltaic blind window of claim 5, wherein when the slats are connected to each other in parallel, all of the slats stacked one above another are arranged such that electrodes having equal polarity are positioned at one side of each of the slats and are connected to each other.

11. The photovoltaic blind window of claim 6, wherein when the slats are connected to each other in parallel, all of the slats stacked one above another are arranged such that electrodes having equal polarity are positioned at one side of each of the slats and are connected to each other.

12. The photovoltaic blind window of claim 10, wherein the dummy lines are arranged to be alternately placed at front and rear sides of the slats stacked one above another.

13. The photovoltaic blind window of claim 9, wherein the slats are connected via a flexible printed circuit board in the vertical direction.

14. The photovoltaic blind window of claim 10, wherein the slats are connected via a flexible printed circuit board in the vertical direction.

15. A photovoltaic blind window comprising:
    multilayer glass comprised of a pair of plate glass sheets joined to each other along rims thereof via spacers to form an internal space between the plate glass sheets, at least one of the plate glass sheets comprising a heat generating window;
    an electric blind received in the internal space of the multilayer glass and including a plurality of slats moved in a vertical direction or tilted by operation of a drive motor;
    a plurality of photovoltaic cells arranged on at least one side of each of the slats; and
    a storage battery storing electric power generated by the photovoltaic cells and supplying the electric power to the heat generating window and the drive motor,
    wherein the plurality of slats are connected to each other in series, and each of the plurality of slats further include a dummy line separate from the photovoltaic cells and traversing each slat in the longitudinal direction such that one of a negative terminal and a positive terminal of a lowermost slat is connected to the other of a negative terminal and a positive terminal of an uppermost slat through the dummy lines of intermediate slats, whereby an electrical circuit is completed.

16. The photovoltaic blind window of claim 15, wherein the photovoltaic cells are connected to each other in series or in parallel on a single slat.

17. The photovoltaic blind window of claim 15, wherein the slats are stacked one above another in a vertical direction and are connected to each other in series or in parallel.

18. A photovoltaic blind window comprising:
    a multilayer glass comprised of a pair of plate glass sheets joined to each other along rims thereof via spacers to form an internal space between the plate glass sheets;
    an electric blind received in the internal space of the multilayer glass and including a plurality of slats movable in a vertical direction or tilted by operation of a drive motor;
    a plurality of photovoltaic cells arranged on at least one side of each of the respective slats, the plurality of photovoltaic cells being connected in series or parallel, and each of the plurality of slats comprising a dummy line separate from the connection of the photovoltaic cells and traversing the respective slat in a longitudinal direction;
    a storage battery storing electric power generated by the photovoltaic cells, one of a positive terminal and a negative terminal of the battery connected to one of a positive and a negative electrode of the plurality of photovoltaic cells of an uppermost slat, and the other of the positive terminal and the negative terminal of the battery connected to a first end of the dummy line of the uppermost slat; and
    one of a positive electrode and a negative electrode of the plurality of photovoltaic cells of a lowermost slat connected to a first end of the dummy line of an upper slat directly above the lowermost slat, such that the dummy lines of the plurality of slats electrically connect the lowermost slat to a second end of the dummy line of the uppermost slat.

* * * * *